United States Patent [19]

Ayers

[11] 4,116,245

[45] Sep. 26, 1978

[54] COMBINATION TIRE INFLATOR AND PRESSURE GAUGE

[76] Inventor: Wayne R. Ayers, R.R. 4, Box 218, Noblesville, Ind. 46060

[21] Appl. No.: 815,298

[22] Filed: Jul. 13, 1977

[51] Int. Cl.$^2$ .............................................. B65B 3/26
[52] U.S. Cl. .................................... 141/98; 141/197; 73/146.3; 152/415
[58] Field of Search .................... 141/98, 38, 192–197; 152/415; 116/34; 73/146.3, 146.2

[56] References Cited

U.S. PATENT DOCUMENTS 3,999,430  12/1976  Pardunn .............................. 73/146.3

FOREIGN PATENT DOCUMENTS 453,199  11/1927  Fed. Rep. of Germany .......... 73/146.3

*Primary Examiner*—Houston S. Bell, Jr.
*Attorney, Agent, or Firm*—Robert A. Spray

[57] ABSTRACT

A combination tire inflator and pressure gauge, having a valving member and a body member having ports and passages with which the valving member co-operates to provide flow or non-flow and selective communication of the pressure source, the gauge, and the tire, depending upon the relative location or setting of the valving member with respect to the body member. In three relative positions of the valving member, respectively, it (1) interconnects the gauge and tire passages, the pressure-source passage being blocked, thus showing tire pressure; (2) vents the tire and gauge passages, the pressure-source passage likewise being blocked, thus venting air from the tire; and (3) causes or permits communication of the pressure-source and the tire passage, the gauge passage being blocked, thus inflating the tire.

10 Claims, 6 Drawing Figures

COMBINATION TIRE INFLATOR AND PRESSURE GAUGE

The present invention relates to a unitary device which is a combination tire inflator and pressure gauge device.

More particularly, concepts of the invention provide such a device which is handy and convenient to use, a single actuator head being all that need be manually moved to achieve either of the three actuations desired, i.e., reading the tire pressure, inflating the tire, or venting excess tire pressure.

In carrying out the invention, a unitary body member is provided to have a pair of valving members, one of which selectively blocks or permits flow from an associated source of air pressure, and the other of which controls the relative intercommunication of the pressure gauge, the tire, and the vent means, thereby to achieve either of the three operational settings desired. A single actuator head, manually operable, controls the settings of both of the valve members.

Thus the concepts achieve a convenient and handy device, easily actuable to achieve whichever operational function is desired.

Primarily useful as a device for tires, for convenience the device is referred to in the specification and claims as being for tires specifically, and the outlet passage is referred to as a "tire passage"; but any type of object to receive pneumatic inflation or regulation is meant by the term "tire", and the inventive concepts are not thus limited to use with merely specifically tires.

The above description is of rather introductory and generalized form. More particular concepts, features, and details of actuation, operation, and construction of an illustrative embodiment are set forth in the following more detailed description which follows, reference being had to the accompanying drawings.

In the drawings, which are somewhat schematic and diagrammatic, an embodiment is set forth as illustrative of the inventive concepts; and in the drawings:

FIG. 1 is an overall elevational view of a device of an illustrative embodiment;

FIGS. 2, 3, and 4 are cross-sectional views through the body member thereof, showing different settings of the internal components.

More particularly, FIG. 2 illustrates the setting for reading the tire pressure;

Figure 3:
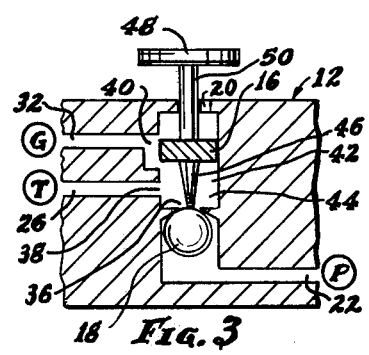
FIG. 3 illustrates the setting for deflating the tire.
Figure 4:
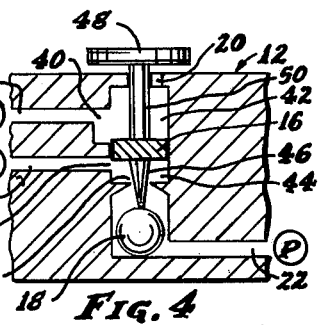
FIG. 4 illustrates the setting for inflating the tire.
Figure 5:
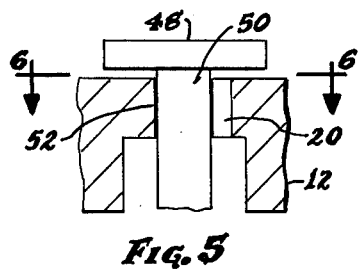
FIG. 5 is a fragmental detail view to illustrate the vent means.
Figure 6:
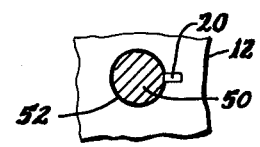
FIG. 6 is a fragmental detail view taken generally as indicated by View-line 6—6 of FIG. 5.

As shown in the drawings, the concepts of present invention provide a combination tire inflator and pressure gauge device 10, shown in FIGS. 1–4, as having as main identifiable components a body member 12 having a pressure gauge 14, and a first valving member 16 and a second valving member shown as a ball 18, the body member means 12 also being provided with a vent means 20 (FIGS. 5 and 6).

The body member means is shown as provided with various passage means, as follows: There is a "pressure-source passage" 22 (also noted as "P") which communicates with an associated source of air under pressure (not shown) as by an inlet pipe or tube 24; also a "tire passage" (also noted as "T") which communicates with the outlet tube 28 and its nozzle 30; and also a "gauge passage" 32 (also noted as "G") which communicates with the pressure gauge 14 through a pipe or conduit 34.

Each of the pressure-source passage 22, the tire passage 26, and the gauge passage 32 communicates at openings 36, 38, and 40, respectively, with a bore or chamber means 42 provided in the body member 12.

Figure 1:
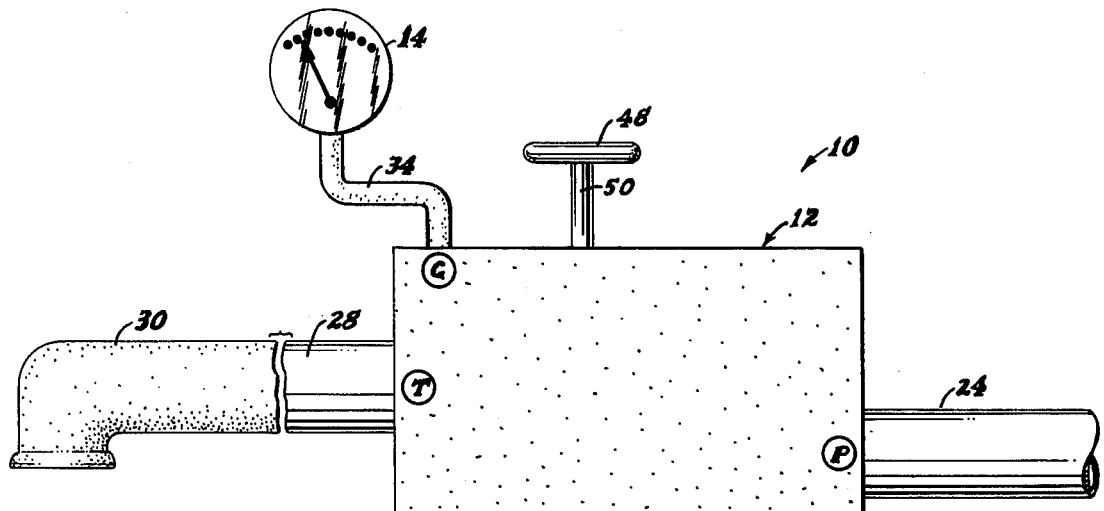
Figure 2:
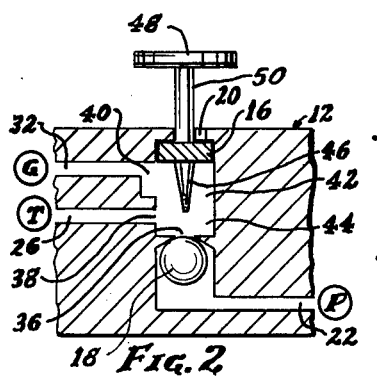

The first valving member 16 and the body member 12, as shown respectively in FIGS. 2, 3, and 4, are provided to have three relative positions or settings of that valving member 16. As shown in those FIGS. 2–4, those positions or settings are illustrated to be as follows:

In a first relative position or setting of valving member 16 (FIG. 2), there is provided communication between the gauge passage 32 and the tire passage 26; and in that first position, the pressure-source passage 22 is non-communicating with either of the gauge passage 32 or the tire passage 26 or the vent means 20. Thus, in that first setting (FIG. 2), the gauge 14 will be indicating tire pressure.

In a second relative position or setting of valving member 16 (FIG. 3), there is provided communication between each of the gauge passage 32 and the tire passage 26 with the vent means 20; and, in that second position, the pressure-source passage 22 is non-communicating with either the gauge passage 32 or the tire passage 26. Thus, in that second setting (FIG. 3), the device 10 will be venting air from the tire.

In a third relative position or setting of valving member 16 (FIG. 4), there is provided communication between the pressure-source passage 22 and the tire passage 26; and, in that third position, communication with either the pressure-source passage 22 and/or tire passage 26 is blocked to the gauge passage 32 and vent means 20. Thus, in that third setting (FIG. 4), inflation of the tire will occur by air from the associated pressure source through pressure-source passage 22 going past the ball 18 through opening 36, through the lower portion 44 of bore or chamber means 42, through opening 38 and tire passage 26 to outlet tube 28 and nozzle 30.

It will be noted in FIGS. 2–4 that the said first valving member 16 when in its first position (FIG. 2) is disposed beyond the location 40 of communication of the gauge passage 32 with the said bore or chamber means 42; and, in the second position (FIG. 3), the said valving member 16 is disposed in location 40 which is the region of communication of the gauge passage 32 with the bore or chamber means 42, but not blocking said communication.

However, the said first valving member 16 in its said third position (FIG. 4) is disposed beyond the location 40 of communication of the gauge passage 32 with the said bore or chamber means 42 but at the opposite side thereof than when the valving member 16 is in the said first or FIG. 2 position.

Further, particularization is to be noted also regarding the relative location shown for openings 36, 38, 40, which respectively communicate the pressure-source passage 22, the tire passage 26, and the gauge passage 32 with the bore 42. That is, the location 38 of the communication of the said tire passage 26 with the said bore or chamber means 42 is between the locations (respectively 40 and 36) of the communication of each of the gauge passage 32 and pressure-source passage 22 with the said bore or chamber means 42.

The valve operativity of the second valving member or ball 18 is as follows: In one position (FIGS. 2 and 3)

it blocks communication of the pressure-source passage 22 with the bore or chamber means 42 by seating against the opening 36 when in the first and second relative positions or settings of the first said valving member 16.

However, the ball 18 has a second position (FIG. 4) in which the ball 18 is off the seat of opening 36 and thus does not block communication of the pressure-source passage 22 with the bore or chamber means 42 when the first said valving member 16 is in its said third relative position or setting.

In the settings of FIGS. 2 and 3, it is accordingly also to be noted that the ball 18 is blocking pressure from pressure-source passage 22 from the tire passage 26, although not in the FIG. 4 setting of tire-inflation.

There is shown control means provided which forces the said second valving member or ball 18 into its said second (FIG. 4) position in accordance with movement of the said first valving member 16 into its said third relative position or setting.

Such control means, as shown, is an abutment member 46 fixed to the said first valving member 16, the abutment 46 being shown as a small-diameter needle-like lug extending from valve member 16 through the opening 36 and engaging the ball 18.

The device 10 is conveniently usable. That is, it is manually actuated to achieve whichever setting and corresponding effect is desired. More particularly, there is shown a manually-operable single actuator head means 48 provided which regulates the relative position or setting of the said first valving member 16 with respect to its three relative positions or settings. That actuator head 48 is shown connected to the valve member 16 by a stem or rod 50.

Even more particularly as shown, the actuator head 48 provides a single manually-operable means which regulates the said first valving member 16 as to all three of its said three relative positions or settings (FIGS. 2-4), that single manually-operable actuator head 48 having three positions or settings which correspond respectively to the said three relative positions or settings of the said first valving member 16.

Venting is shown by a recess opening 20 in body member 12, adjacent the body member opening 52 through which extends the stem or rod 50.

The concepts achieve further economy and maintenance-minimization by not even requiring any springs, even though there are various actuations of the two different valve members 16 and 18. Air pressure from the associated pressure source biases the ball 18 to its raised or seated position, closing the opening 36 in the settings shown in FIGS. 2 and 3. And pressures of either the pressure-source, the tire, or the gauge biases the valving member upward to its FIG. 2 position.

SUMMARY

It is thus seen that a combination tire inflator and pressure gauge device, according to concepts of the present invention, provides novel and advantageous concepts and features, providing not only an effective pressure dispenser and gauge, but one in a combination device which provides convenience and handiness in use either to read the tire pressure, or to inflate or deflate the tire. Each of the conditions, for achieving each of those operations or actuations, is achieved by convenient manual actuation of a single actuator member.

Accordingly, it will thus be seen from the foregoing description of the invention according to this illustrative embodiment, considered with the accompanying drawings, that the present invention provides a new and useful combination tire inflator and pressure gauge, having desired advantages and characteristics of construction and operation, and accomplishing its intended objects, including those hereinbefore pointed out and others which are inherent in the invention.

Modifications and variations may be effected without departing from the scope of the novel concepts of the invention; accordingly, the invention is not limited to the specific form or arrangement of parts herein described or shown for illustration of the inventive concepts.

What is claimed is:

1. A combination tire inflator and pressure gauge means, comprising:
   a body member means;
   a pressure gauge; and
   a valving member;
   the body member means having a vent means, and being provided with passage means respectively operatively communicating with an associated source of pressure, the tire, and the pressure gauge;
   the valving member and the body member means being provided to have three relative positions or settings of the valving member, said positions or settings being such as follows:
   in a first relative position or setting there is provided communication between the gauge passage and the tire passage, the pressure-source passage being non-communicating with either of them or the vent means, thus the gauge indicating tire pressure;
   in a second relative position or setting there is provided communication between each of the gauge passage and the tire passage with the vent means, the pressure-source passage being non-communicating with either, thus venting air from the tire; and
   in the third relative position or setting there is provided communication between the pressure-source passage and the tire passage, but communication with either is blocked to the gauge passage and vent means, thus inflating the tire by air from the associated pressure source.

2. The invention as set forth in claim 1 in a combination in which the body member means is provided with a bore or chamber-means which communicates with the gauge passage;
   the said valving member in said first position being disposed beyond the location of communication of the gauge passage with said bore or chamber means,
   and the valving member in the second position being disposed in the region of communication of the gauge passage with the bore or chamber means, but not blocking said communication,
   and the said valving member in the said third position being disposed beyond the location of communication of the gauge passage with said bore or chamber means but at the opposite side thereof than when in the said first position.

3. The invention as set forth in claim 1 in a combination in which the said body member means is provided with a bore or chamber means in which the said valving member is disposed and travels in its movement to and between the said three relative positions or settings,
   and each of the gauge passage and tire passage and pressure-source passage communicates with said bore or chamber means.

4. The invention as set forth in claim 3 in a combination in which the location of the communication of the said tire passage with said bore or chamber means is between the location of the communication of each of the gauge passage and pressure-source passage with the said bore or chamber means.

5. The invention as set forth in claim 1 in a combination in which there is provided a second valving member which has one position in which it blocks communication of the pressure-source passage with the bore or chamber means in the first and second relative positions or settings of the first said valving member, but has a second position in which it does not block communication of the pressure-source passage with the bore or chamber means when the first said valving member is in its said third relative position or setting.

6. The invention as set forth in claim 1 in a combination in which there is provided a second valving member which has one position in which it blocks communication of the pressure-source passage with the tire passage in the first and second relative positions or settings of the first said valving member, but has a second position in which it does not block communication of the pressure-source passage with the tire passage when the first said valving member is in its said third relative position or setting.

7. The invention as set forth in claim 5 in a combination in which there is provided control means which forces the said second valving member into its said second position in accordance with movement of the said first valving member into its said third relative position or setting.

8. The invention as set forth in claim 7 in a combination in which the said control means is an abutment member fixed to the said first valving member.

9. The invention as set forth in claim 1 in a combination in which there are manually-operable means provided which regulate the relative position or setting of the said first valving member with respect to which of its three relative positions or settings it is in at any time.

10. The invention as set forth in claim 9 in a combination in which a single manually-operable means regulates the said first valving member as to all three of its said three relative positions or settings, that single manually-operable means having three positions or settings which correspond respectively to the said three relative positions or settings of the said first valving member.

* * * * *

UNITED STATES PATENT OFFICE
CERTIFICATE OF CORRECTION

Patent No. 4,116,245     Dated September 26, 1978

Inventor(s) Wayne R. Ayers

It is certified that error appears in the above-identified patent and that said Letters Patent are hereby corrected as shown below:

Col. 1, Line 68: After the quote mark which follows "passage" but before the parenthesis mark which precedes "also" insert: --26--

Signed and Sealed this

Seventeenth Day of April 1979

[SEAL]

Attest:

RUTH C. MASON
*Attesting Officer*

DONALD W. BANNER
*Commissioner of Patents and Trademarks*